(12) United States Patent
Yoshioka et al.

(10) Patent No.: US 8,913,305 B2
(45) Date of Patent: Dec. 16, 2014

(54) RECORDING APPARATUS

(71) Applicant: Seiko Epson Corporation, Tokyo (JP)

(72) Inventors: Ichiro Yoshioka, Nagano (JP); Seiichi Taniguchi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/023,950

(22) Filed: Sep. 11, 2013

(65) Prior Publication Data
US 2014/0078562 A1    Mar. 20, 2014

(30) Foreign Application Priority Data

Sep. 14, 2012 (JP) .................................. 2012-202382

(51) Int. Cl.
| | |
|---|---|
| *H04N 1/04* | (2006.01) |
| *H04N 1/00* | (2006.01) |
| *H04N 1/40* | (2006.01) |
| *H04N 1/047* | (2006.01) |
| *H04N 1/107* | (2006.01) |
| *H04N 1/12* | (2006.01) |
| *H04N 1/193* | (2006.01) |

(52) U.S. Cl.
CPC ............. *H04N 1/00533* (2013.01); *H04N 1/40* (2013.01); *H04N 1/00496* (2013.01); *H04N 1/00535* (2013.01); *H04N 1/00541* (2013.01); *H04N 1/00907* (2013.01); *H04N 1/0473* (2013.01); *H04N 1/1077* (2013.01); *H04N 1/12* (2013.01); *H04N 1/193* (2013.01); *H04N 2201/0081* (2013.01); *H04N 2201/0096* (2013.01); *H04N 2201/04727* (2013.01); *H04N 2201/0082* (2013.01)
USPC ............................ 358/474; 358/497; 358/498

(58) Field of Classification Search
CPC . H04N 1/00533; H04N 1/40; H04N 1/00496; H04N 1/00535; H04N 1/00541; H04N 1/00907; H04N 1/0473; H04N 1/1077; H04N 1/12; H04N 1/193; H04N 2201/0081; H04N 2201/0082; H04N 2201/0096
USPC .................. 358/473, 474, 471, 497, 498, 482
See application file for complete search history.

(56) References Cited

U.S. PATENT DOCUMENTS

| | | | |
|---|---|---|---|
| 5,602,650 A | 2/1997 | Tamura et al. | |
| 5,889,597 A * | 3/1999 | Ara et al. | ...................... 358/473 |

(Continued)

FOREIGN PATENT DOCUMENTS

| | | |
|---|---|---|
| JP | 07-311838 A | 11/1995 |
| JP | 2008-019016 A | 1/2008 |

*Primary Examiner* — Negussie Worku
(74) *Attorney, Agent, or Firm* — Global IP Counselors, LLP

(57) ABSTRACT

There is a problem in that, when a handle section is provided in a recording device, the handle section protrudes from a casing and the size of the recording apparatus is increased. A recording apparatus is provided with a recording head which records on paper and a discharge tray which is provided to be able to slide with regard to a casing and holds the paper which is recorded upon using the recording head and discharged, where the discharge tray has a through section which is formed on the downstream side in a discharge direction and a handle section which is formed at an edge section more to the downstream side in the discharge direction than the through section, the handle section is accommodated inside of the casing in a state where the discharge tray is accommodated in the casing, the through section and the handle section are positioned outside of the casing in a state where the discharge tray is drawn out from the casing, and the discharge tray is supported in a state of hanging down from the casing.

12 Claims, 8 Drawing Sheets

(56) References Cited

U.S. PATENT DOCUMENTS

| | | | |
|---|---|---|---|
| 6,246,466 B1 * | 6/2001 | Hirano et al. | 355/407 |
| 6,992,799 B1 * | 1/2006 | Chen | 358/442 |
| 7,277,207 B2 * | 10/2007 | Okamoto et al. | 358/486 |
| 7,443,547 B2 * | 10/2008 | Moreno et al. | 358/472 |
| 7,468,816 B2 * | 12/2008 | Silverbrook et al. | 358/472 |
| 7,599,104 B2 * | 10/2009 | Nobe et al. | 358/498 |
| 7,933,052 B2 * | 4/2011 | Hamada et al. | 358/498 |
| 8,140,036 B2 * | 3/2012 | Minami | 455/154.2 |
| 2005/0063007 A1 * | 3/2005 | Silverbrook et al. | 358/1.15 |
| 2005/0219656 A1 * | 10/2005 | Sato | 358/498 |
| 2005/0286091 A1 * | 12/2005 | Harel et al. | 358/474 |
| 2006/0001920 A1 * | 1/2006 | Moreno et al. | 358/498 |

* cited by examiner

RECORDING APPARATUS

CROSS-REFERENCE TO RELATED APPLICATIONS

This application claims priority to Japanese Patent Application No. 2012-202382 filed on Sep. 14, 2012. The entire disclosure of Japanese Patent Application No. 2012-202382 is hereby incorporated herein by reference.

BACKGROUND

1. Technical Field

The present invention relates to a recording apparatus.

2. Background Technology

A handle section is provided on a portable type of recording apparatus, the handle section is grasped when a user carries the recording apparatus, and moving of the recording apparatus is easy. For example, in Patent Document 1, a retractable handle section is provided with regard to a paper feeding cassette and a user carries the recording apparatus in a state of being lifted by hand by holding the handle section in a state of being drawn out from the paper feeding cassette. In addition, there is a recording apparatus which is small in size and provided with a reading section where a document is read by the recording apparatus. For example, in Patent Document 2, a recording apparatus is disclosed which is provided with an accommodating section which accommodates a hand-held scanner.

Japanese Laid-open Patent Publication No. 2008-19016 (Patent Document 1) and Japanese Laid-open Patent Publication No. H7-311838 (Patent Document 2) are examples of the related art.

SUMMARY

Problem to be Solved by the Invention

However, in Patent Document 1, there is a problem in that the handle section protrudes from the paper feeding cassette and the size of the recording apparatus increases in a state where the handle section is pushed into the paper feeding cassette. In addition, in the recording apparatus which is mounted with the hand-held scanner as in Patent Document 2, it is necessary to provide a display section for displaying processing content, setting conditions, and the like and an operating section for operation content to be input by the user in each of the hand-held scanner and the recording apparatus. As a result, even in a recording apparatus which is mounted with the hand-held scanner, there is a problem in that the size of the recording apparatus increases.

The invention is carried out in order to solve at least some of the problems described above and is able to be realized in the following forms or applied examples.

Means for Solving Problem

Applied Example 1

A recording apparatus is provided with a recording head which records on a recording medium and a discharge tray which is provided to be able to slide with regard to a casing and holds the recording medium which is recorded upon using the recording head and discharged, where the discharge tray has a through section which is formed on the downstream side in a discharge direction and a handle section which is formed at an edge section more to the downstream side in the discharge direction than the through section, the handle section is accommodated inside of the casing in a state where the discharge tray is accommodated in the casing, the through section and the handle section are positioned outside of the casing in a state where the discharge tray is drawn out from the casing, and the discharge tray is supported in a state of hanging down from the casing.

According to the present applied example, the discharge tray has the handle section which is formed at the through section which is formed on the downstream side in the discharge direction and an edge section more to the downstream side in the discharge direction than the through section, the through section and the handle section are positioned outside of the casing in a state where the discharge tray is drawn out from the casing, and the discharge tray is supported in a state of hanging down from the casing. Due to this, it is possible for the user to grasp the handle section using a hand and to carry the recording apparatus in a state of being lifted by hand. Then, the handle section is accommodated inside of the casing in a state where the discharge tray is accommodated in the casing. As a result, it is possible to suppress an increase in the size of the recording apparatus.

Applied Example 2

The recording apparatus described above where the discharge tray closes off a discharge opening from which the recording medium is discharged in a state where the discharge tray is accommodated in the casing.

According to the present applied example, it is possible to suppress infiltration of dirt or dust from the discharge opening when the recording apparatus is not in use. In addition, the aesthetics of the outer appearance of the recording apparatus are improved.

Applied Example 3

The recording apparatus described above where the thickness of the discharge tray is formed to be thicker toward the downstream side in the discharge direction.

According to the present applied example, the discharge opening is formed in an upper section of the discharge tray in a state where the discharge tray is drawn out from the casing and it is possible for the discharge opening to be closed off in a state where the discharge tray is accommodated in the casing.

Applied Example 4

The recording apparatus described above is further provided with a scanner section which reads a document and the document which is read by the scanner section is discharged to the discharge tray and held in the discharge tray.

According to the present applied example, it is possible to suppress an increase in the size of the recording apparatus since it is possible for the discharge tray which holds the recording medium and the discharge tray which holds the document to be used together.

Applied Example 5

A recording apparatus is provided with a printer section which prints onto the recording medium, a scanner section which is mounted to be able to be attached to and detached from the printer section has a display section, an operating section, and a control section, and which reads an image, and a mounting state detecting section which detects whether the scanner section is mounted to or separated from the printer section, where, using the detection result of the mounting state detecting section, the control section executes display and output using the display section and operational input using the operating section in a fixed mode where the scanner section reads while fixed when the scanner section is mounted to the printer section, and the control section executes display and output using the display section and operational input using the operating section in a moving mode where the scanner section reads while being moved when the scanner section is separated from the printer section.

According to the present applied example, the control section which is provided in the scanner section determines between the fixed mode or the moving mode using the detection results of the mounting state detecting section. Due to this, it is possible for the user to use the recording apparatus without having to distinguish between the fixed mode or the moving mode.

Applied Example 6

The recording apparatus described above where the scanner section is provided with acceleration sensors and the control section acquires angular velocity from the acceleration sensors while an image is being read when in the moving mode and corrects the image which is read based on an amount of positional deviation which is calculated from the angular velocity.

According to the present applied example, the quality of the image which is read is improved.

Applied Example 7

The recording apparatus described above where the control section detects information on the posture of the scanner section based on the output information from the acceleration sensors when in the fixed mode and sets text which is displayed on a display section to be written vertically or horizontally based on the information on the posture which is detected.

According to the present applied example, it is easy for the user to visually recognize text which is displayed in the display section.

BRIEF DESCRIPTION OF THE DRAWINGS

Referring now to the attached drawings which form a part of this original disclosure.

DETAILED DESCRIPTION OF EXEMPLARY EMBODIMENTS

Below, embodiments of the invention will be described by referencing the diagrams.

Embodiment 1

Figure 1A:
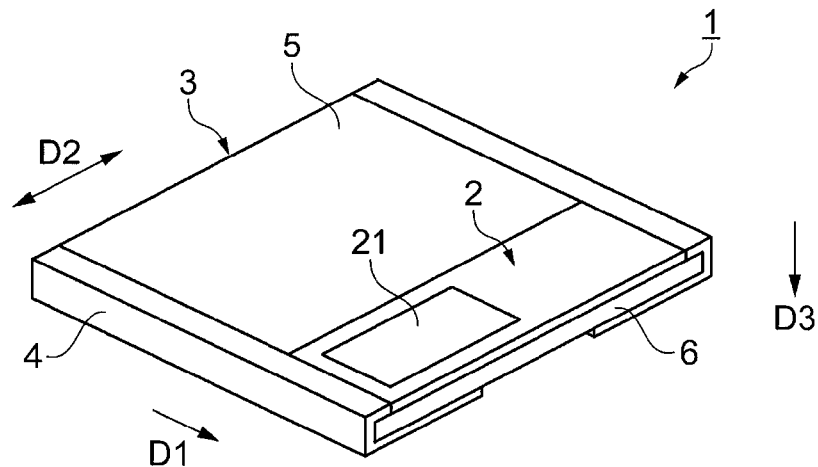
FIG. 1A is a perspective diagram of the outer appearance of a recording apparatus and FIG. 1B is a perspective diagram of the outer appearance of a recording apparatus in a state where a lid section is open and a discharge tray is drawn out.

FIG. 1A is a perspective diagram of the outer appearance of a recording apparatus 1 according to embodiment 1 when viewed from a front surface side. The recording apparatus 1 is configured from a printer section 3 and a hand-held scanner 2 as a scanner section which is mounted to be able to be attached to and detached from the printer section 3 and a casing 4. A touch panel 21 which has a display function and an operating function is provided in the hand-held scanner 2. A discharge tray 6 is provided to be able to slide in a lower section of the hand-held scanner 2 in a vertical direction D3.

Figure 1B:
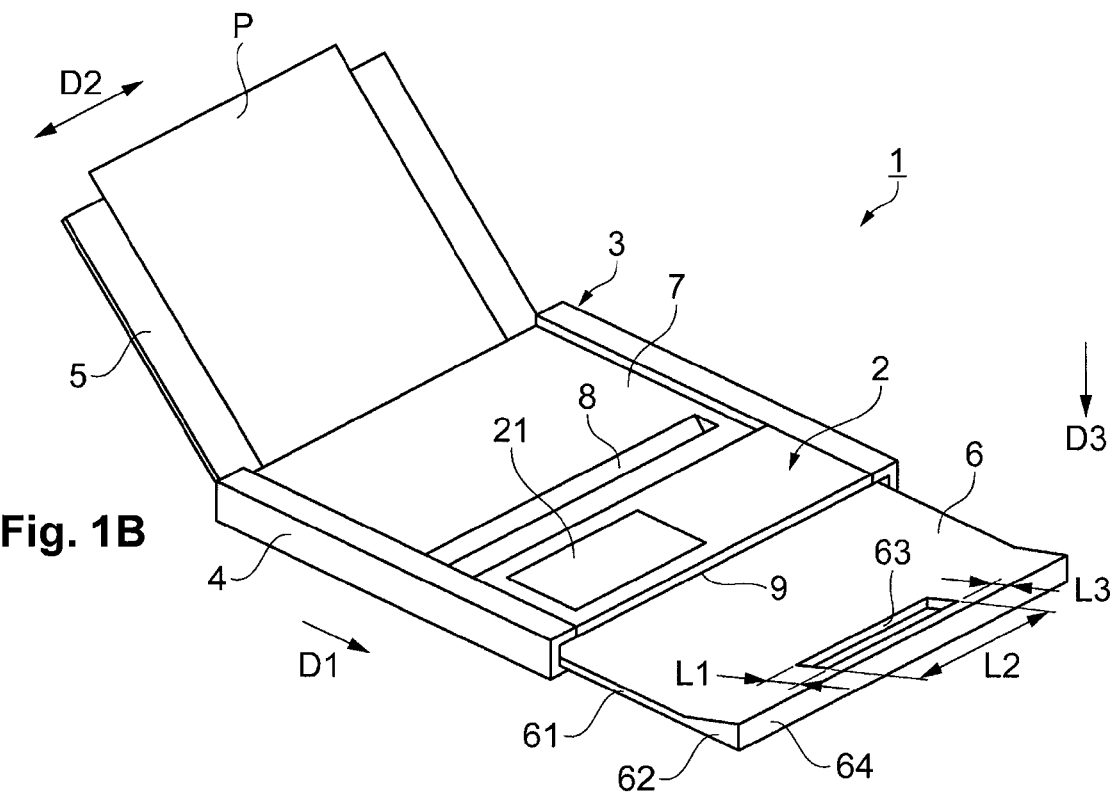

FIG. 1B is a perspective diagram of the outer appearance of the recording apparatus 1 in a state where a lid section 5 in FIG. 1A is open and the discharge tray 6 is drawn out. The lid section 5 is provided to be able to rotate with the rear surface side of the recording apparatus 1 as a pivot. As shown in FIG. 1B, the lid section 5 functions as a paper support, where paper P which is a recording medium is held, in a state where the lid section 5 is open.

The paper P is fed from an opening section (which is not shown in the diagram) which is provided in the rear surface of the recording apparatus 1 inside the printer section 3 and is recorded upon inside the printer section 3. The paper P which is recorded upon is held in the discharge tray 6 due to being discharged from a discharge opening 9 in a discharge direction D1.

An upper surface 7 of the printer section 3 is exposed in a state where the lid section 5 is open. An opening section 8, which extends in a width direction D2 of the paper P, is provided on the upper surface 7. A document (which is not shown in the diagram) is inserted from the opening section 8 by a user, and text and images which are depicted on the document are read by the hand-held scanner 2. The document which is read is held in the discharge tray 6 due to being discharged from the discharge opening 9 in the discharge direction D1.

A through section 63 with a rectangular shape is formed on the downstream side of the discharge tray 6 in the discharge direction D1. A handle section 64 is formed at an edge section on the downstream side of the through section 63 in the discharge direction D1. A length L1 of the through section 63 in the discharge direction D1 and a length L2 of the through section 63 in the width direction D2 are lengths where it is possible for the user to insert four fingers excluding the thumb into the through section 63 by lining up the fingers in the width direction D2. In addition, a length L3 of the handle section 64 in the discharge direction D1 is a length where it is possible for the user to insert four fingers and grasp the through section 63 with four fingers.

The thickness of the discharge tray 6 in the vertical direction D3 is formed to be thicker toward the downstream side in the discharge direction D1. That is, an edge section 62 of the discharge tray 6 on the downstream side in the discharge direction D1 is thicker than a plate section 61 on the upstream side in the discharge direction D1.

Due to such a configuration, the discharge opening 9 is closed off by the edge section 62 in a state where the discharge tray 6 is accommodated in the casing 4 in FIG. 1A, and the discharge opening 9 is formed above the discharge tray 6 in the vertical direction D3 in a state where the discharge tray 6 is drawn out from the casing 4 in FIG. 1B.

Figure 2A:
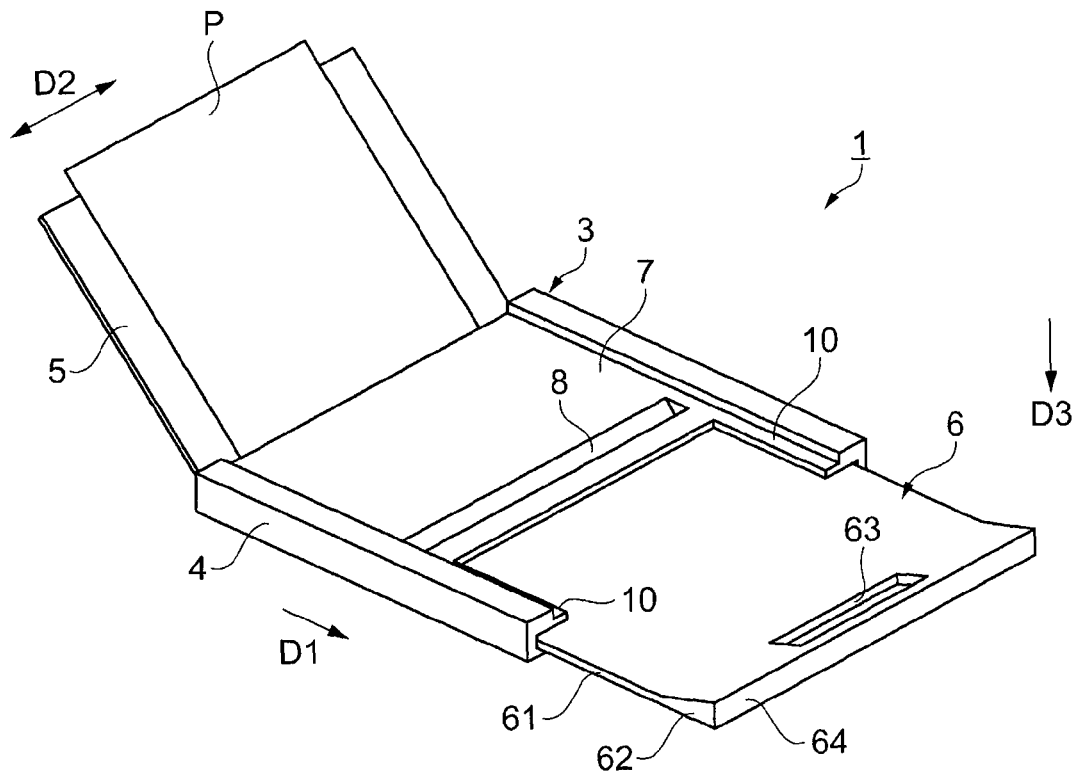
FIG. 2A is a perspective diagram of the outer appearance of a recording apparatus in a state where a hand-held scanner is drawn out.

FIG. 2A is a perspective diagram of the outer appearance of the recording apparatus 1 in a state where the hand-held scanner 2 is drawn out from FIG. 1B. Fixing sections 10 are formed in upper edge sections on both sides on the front surface side of the casing 4 in the width direction D2, and the hand-held scanner 2 is fixed by the fixing sections 10 in a state where the hand-held scanner 2 is mounted in the casing 4. The discharge tray 6 is exposed at the bottom of the fixing section 10 in the vertical direction D3 in a state where the hand-held scanner 2 is drawn out from the casing 4.

Figure 2B:
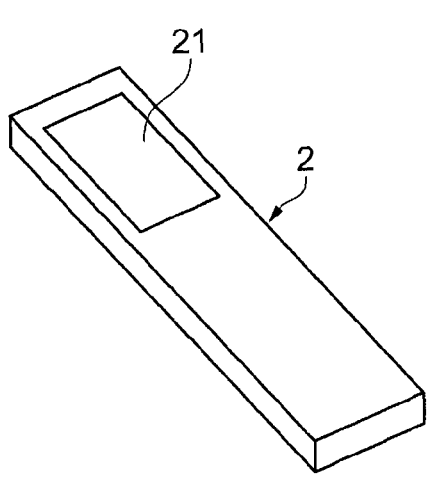
FIG. 2B is a perspective diagram of the outer appearance of a hand-held scanner when viewed from a touch panel side.
Figure 2C:
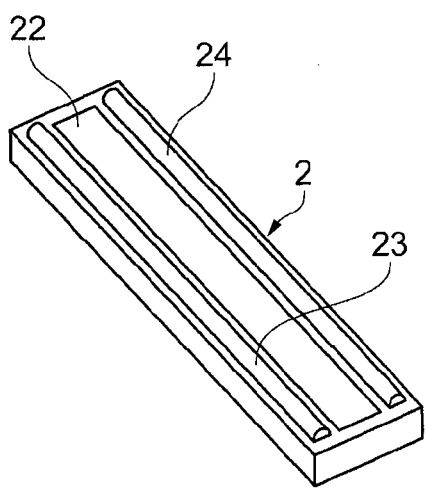
FIG. 2C is a perspective diagram of the outer appearance of a hand-held scanner when viewed from the opposite side to a touch panel side.

FIG. 2B is a perspective diagram of the outer appearance of the hand-held scanner 2 when viewed from the touch panel 21 side and FIG. 2C is a perspective diagram of the outer appearance of the hand-held scanner 2 when viewed from the opposite side to the touch panel 21 side. An image sensor 22, which extends in the longitudinal direction of the hand-held scanner 2, is provided on the hand-held scanner 2 at the opposite side to the touch panel 21 side in FIG. 2C. In addition, driving rollers 23 and 24, which extend in the longitudinal direction of the hand-held scanner 2, are provided on both sides of the image sensor 22.

A drive motor (which is not shown in the diagram) and a mechanism for switching (which is not shown in the diagram) between states of rotational driving force of the drive motor being transferred or not being transferred to the driving rollers 23 and 24 are provided in the hand-held scanner 2. Due to this, it is possible to set a self-operating mode where the hand-held scanner 2 is self-operated due to rotational driving of the driving rollers 23 and 24 or to set a manual mode where the user moves the hand-held scanner 2 by the driving rollers 23 and 24 being in a state where free rotation is possible.

Figure 3A:
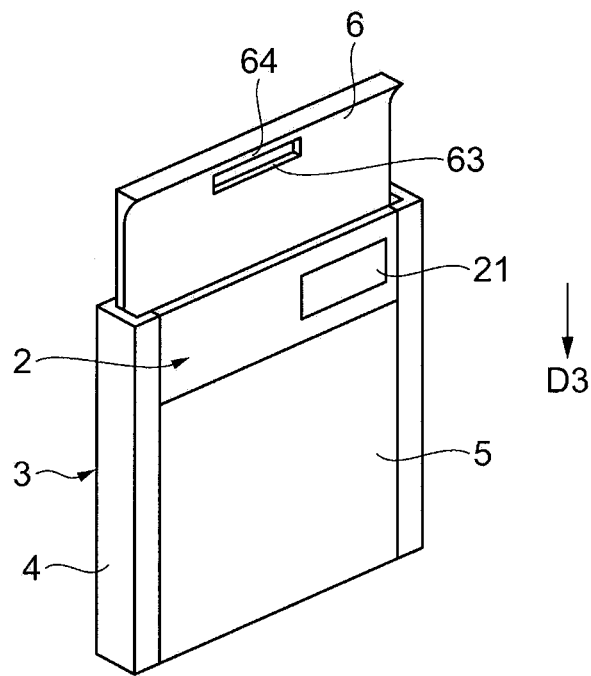
FIG. 3A is a perspective diagram of the outer appearance of a recording apparatus in a state of being carried by a user and FIG. 3B is a perspective diagram of the outer appearance of a recording apparatus where a base kit is provided.
Figure 3B:
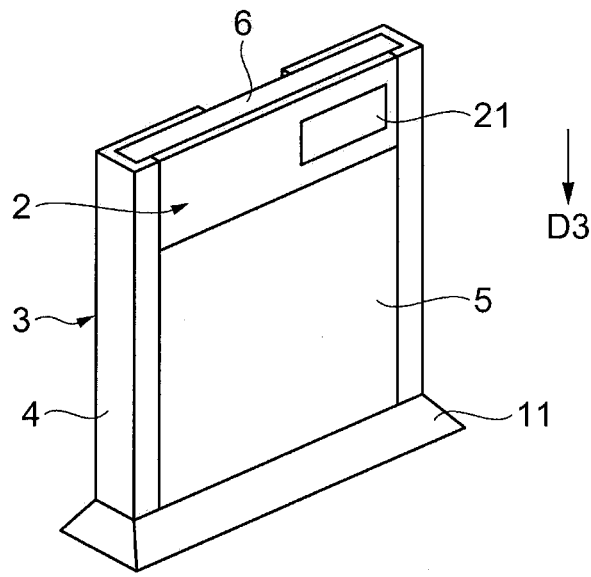

FIGS. 3A-3B are perspective diagrams of the outer appearance of the recording apparatus 1 in a state of being carried by a user. When the recording apparatus 1 is carried by the user, the recording apparatus 1 is carried in a state where the discharge tray 6 is drawn out from inside of the casing 4. The user inserts the tip of a hand in the through section 63 which is provided in the discharge tray 6 and the recording apparatus 1 is carried with a posture of being lifted by hand from below in the vertical direction D3 while the handle section 64 is being grasped.

Figure 4A:
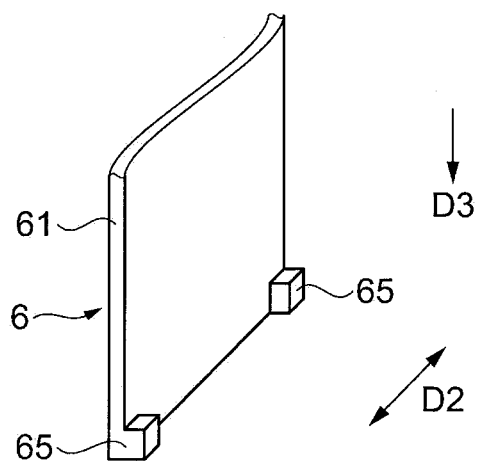
FIG. 4A is a perspective diagram illustrating a portion of a discharge tray where protruding sections are formed and FIGS. 4B and 4C are cross sectional diagrams of a portion of a discharge tray where protruding sections are formed.

FIG. 4A is a perspective diagram of a portion of the discharge tray 6 where protruding sections 65 are formed. A pair of protruding sections 65 which protrude from the plate section 61 are formed in edge sections on the bottom of the discharge tray 6 in the posture of the recording apparatus 1 in FIG. 3A, that is, both edge sections on the upstream side of the discharge tray 6 in the discharge direction D1 in the posture of the recording apparatus 1 in FIG. 1B.

Figure 4B:
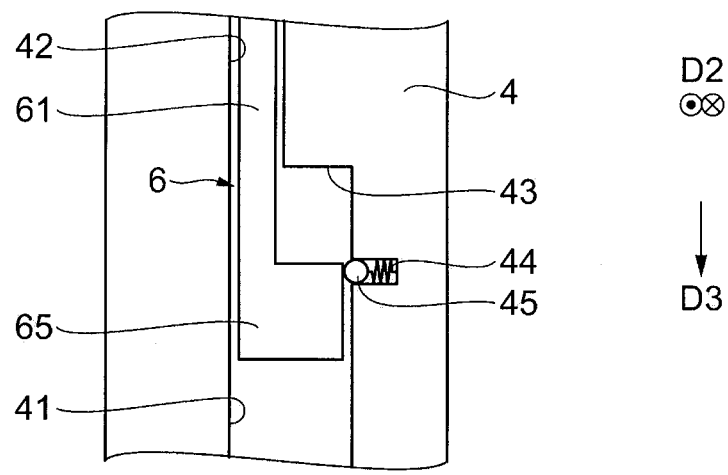
Figure 4C:
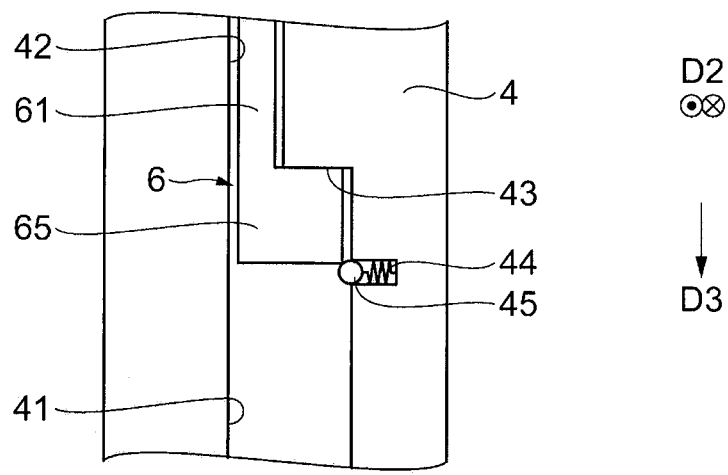

FIGS. 4B and 4C are cross sectional diagrams of a portion of the discharge tray 6 where the protruding sections 65 are formed when viewed from the width direction D2. A groove section 42 is formed in the casing 4 to be longer than the length of the plate section 61 and shorter than the length of the protruding sections 65 in the up and down direction in the diagram and such that the plate section 61 is able to slide in the up and down direction in the diagram. In addition, a groove section 41 is formed in the casing 4 to be longer than the protruding section 65 in the up and down direction in the diagram and such that the protruding sections 65 are able to slide in the up and down direction in the diagram.

A spherical member 45 and a pressing member 44 which presses the spherical member 45 in the left and right direction in the diagram are provided in the casing 4. As shown in FIG. 4B, the protruding sections 65 slide while the spherical section 45 is pushed against the pressing force of the pressing member 44.

As shown in FIG. 4C, the protruding sections 65 abut against an abutting section 43 which is formed at the boundary of the groove section 41 and the groove section 42. Movement of edge sections of the protruding sections 65 on the lower side in the diagram are regulated by the spherical member 45.

Due to such a configuration, it is possible for the discharge tray 6 to be supported in a state of hanging down from the recording apparatus 1. It is possible for the user to grasp the handle section 64 of the discharge tray 6 by hand and to carry the recording apparatus 1 in a state of being lifted by hand.

It is possible for the protruding sections 65 to slide while the spherical section 45 is pushed again against the pressing force of the pressing member 44 as shown in FIG. 4B by the discharge tray 6 being pushed down in the diagram by the user.

A locking mechanism (which is not shown in the diagram), which locks the discharge tray 6 by the discharge tray 6 being further pushed down in the diagram by the user, is provided. The locking mechanism is released by the user taking out the discharge tray 6 from the inside of the casing 4.

FIG. 3B is a perspective diagram of the outer appearance of the recording apparatus 1 where a base kit 11 is provided. Rechargeable batteries (which are shown in the diagram) are provided in the base kit 11. Rechargeable batteries (which are shown in the diagram) are provided in each of the printer section 3 and the hand-held scanner 2 in the recording apparatus 1. The base kit 11 is mounted in the recording apparatus 1 and charges each of the rechargeable batteries.

Figure 5:
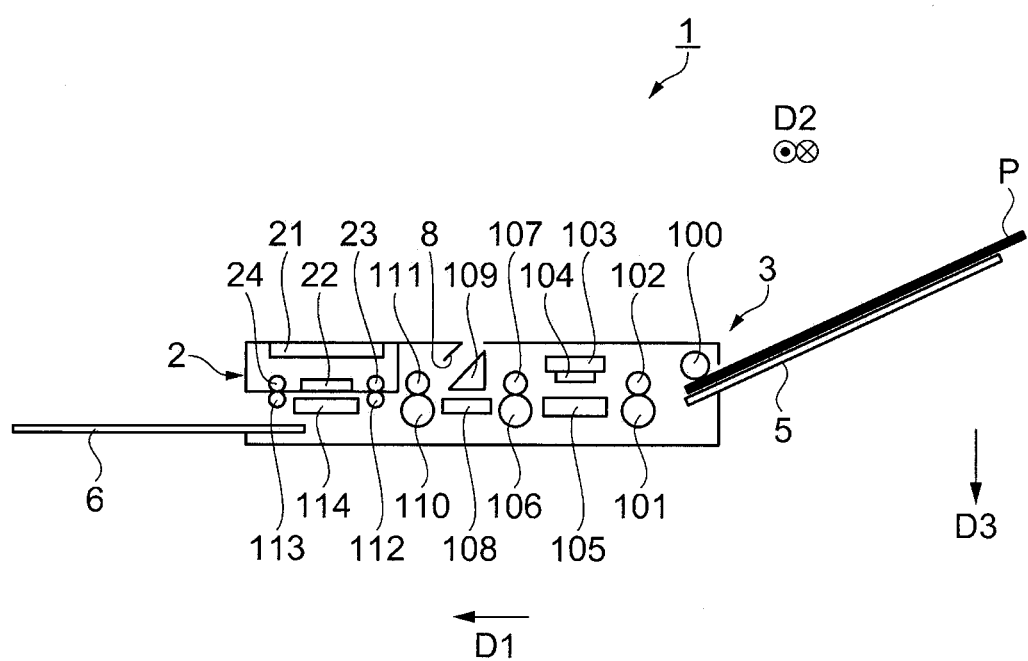
FIG. 5 is a schematic diagram illustrating an outline configuration of a recording apparatus.

FIG. 5 is a schematic diagram illustrating an outline configuration of the recording apparatus 1. The paper P which is held by the lid section 5 is fed by a feeding roller 100. A first driving roller 101 and a driven roller 102 which rotates by abutting against and being driven by the first driving roller 101, a second driving roller 106 and a driven roller 107 which rotates by abutting against and being driven by the second driving roller 106, a third driving roller 110 and a driven roller 111 which rotates by abutting against and being driven by the third driving roller 110 are provided so as to line up from the upstream side toward the downstream side in the discharge direction D1. The paper P is nipped by the driving rollers and the driven rollers and is transported in the discharge direction D1.

A carriage 103 which reciprocates in the width direction D2 and a recording head 104 which is provided in the carriage 103 and ejects ink are provided between the first driving roller 101 and the second driving roller 106. A support section 105, which supports the paper P and which regulates the distance between the recording head 104 and the paper P which is being transported, is provided at a position which opposes the recording head 104. An image is formed on the paper P by ink being ejected from the recording head 104 onto the paper P which is being transported.

The opening section 8, which is provided in an upper portion of the casing, and a guiding section 109, which guides a document (which is not shown in the diagram) which is inserted from the opening section 8 to a nipping position between the third driving roller 110 and the driven roller 111, are provided between the second driving roller 106 and the third driving roller 110. A guide section 108, which guides the paper P which is being transported in the discharge direction D1, is provided below the guiding section 109.

The hand-held scanner 2 which has the touch panel 21, the image sensor 22, and the driving rollers 23 and 24 is mounted at the downstream side of the third driving roller 110 in the discharge direction D1 to be able to be attached and detached. When the hand-held scanner 2 is mounted in the casing 4, the driving rollers 23 and 24 are set in a state where free rotation is possible by the switching mechanism described above. A support section 114, which supports the paper P or the document which is being transported, is provided below the image sensor 22.

A fourth driving roller 112 and a fifth driving roller 113, which drive the driving rollers 23 and 24 by abutting against the driving rollers 23 and 24, are provided below the driving rollers 23 and 24 which are set in a state where free rotation is possible. The paper P or the document is nipped by each of the driving roller 23 and the fourth driving roller 112 and the driving roller 24 and the fifth driving roller 113 and is discharged in the discharge direction. The paper P or the document which is discharged is held on the discharge tray 6. The image sensor 22 reads an image which is depicted on the document which is transported below the hand-held scanner 2.

Figure 6:
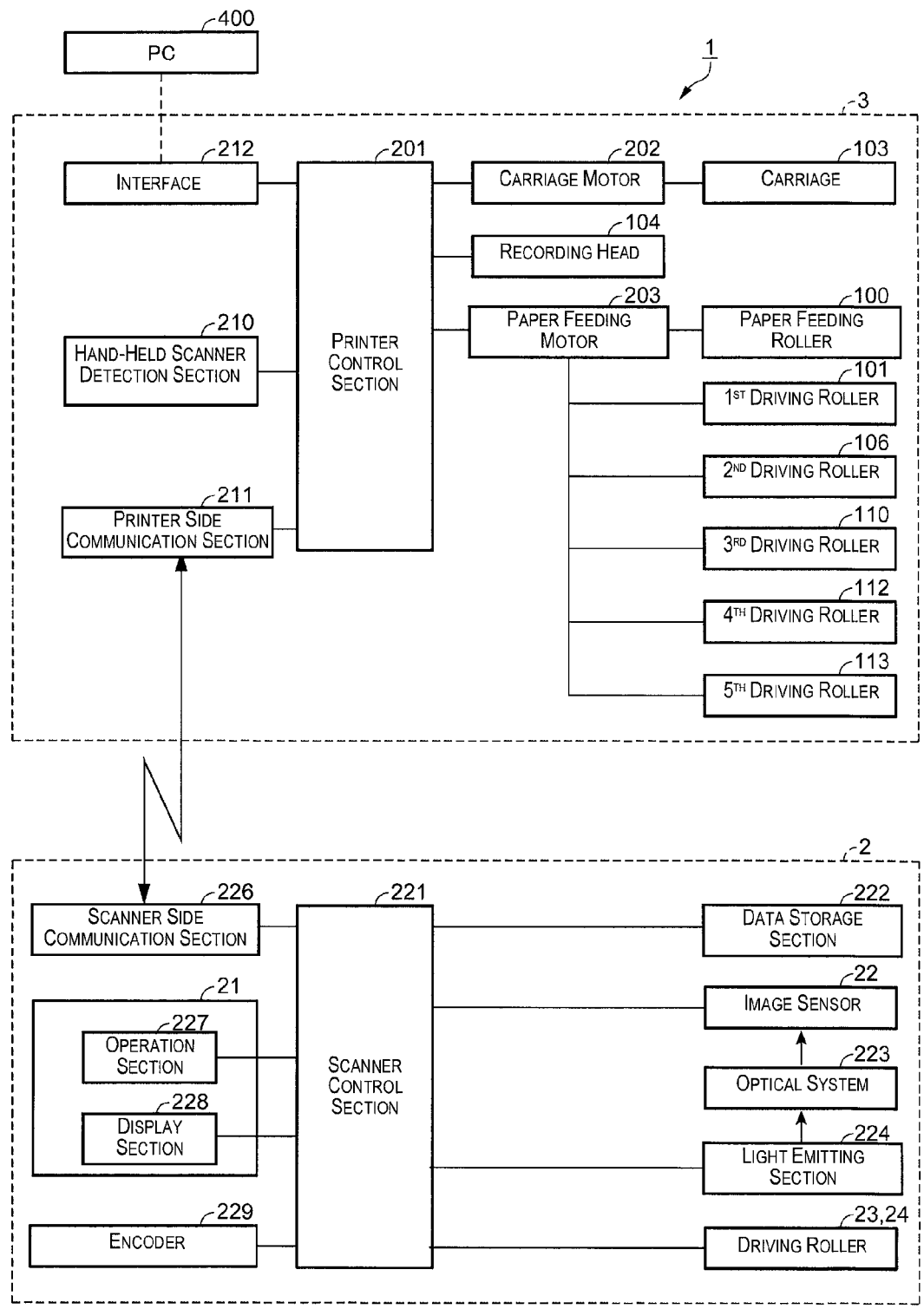
FIG. 6 is a block diagram illustrating an outline of an electrical configuration of a recording apparatus.

FIG. 6 is a block diagram illustrating an outline of an electrical configuration of the recording apparatus 1. A printer control section 201 in the printer section 3 performs rotational drive control on a carriage motor 202 which moves the carriage 103, ink discharge control on the recording head 104, and rotational drive control on a paper feeding motor 203.

A driving force is transferred by a gear mechanism (which is not shown in the diagram), which is formed from a plurality of gears which are driven by the paper feeding motor 203, in the first driving roller 101, the second driving roller 106, the third driving roller 110, the fourth driving roller 112, and the fifth driving roller 113. The feeding roller 100 has the drive timing set using a switching mechanism (which is not shown in the diagram) which includes a cam or the like and is driven by the paper feeding motor 203.

A hand-held scanner detection section 201, which detects whether the hand-held scanner 2 is mounted in the casing 4 or is separated from the casing 4, is provided in the printer section 3. A printer side communication section 211 is provided in the printer section 3.

An interface 212, which performs wireless communication or communication using wires with a personal computer (PC) 400 which is placed outside of the recording apparatus 1, is provided in the printer section 3.

A light emitting section 224, an optical system 223, and the image sensor 22 are provided in the hand-held scanner 2. The light emitting section 224 irradiates light onto the document in order to take in the image which is depicted on the document which is below the image sensor 22. The optical system 223 is configured by a mirror (which is not shown in the diagram) and a lens (which is not shown in the diagram) in order to focus the light which is reflected by the document.

The image sensor 22 photoelectrically converts the light which is focused by the optical system 223. A scanner control section 221 A/D converts an analog signal which is output from the image sensor 22 and stores the A/D converted analog signal in a data storage section 222 as image data. The image sensor 22 is configured from a CMOS sensor, a CCD sensor, or the like.

An encoder 229, which detects the rotation direction and the number of rotations of the drive rollers 23 and 24, are provided in the hand-held scanner 2. The scanner control section 221 generates a sub-scanning timing signal based on detection by the encoder 229. The scanner control section 221 counts the number of pulses of the sub-scanning timing signal and calculates the amount of movement of the hand-held scanner 2.

The touch panel 21 is provided in the hand-held scanner 2. The touch panel 21 has a display section 228 which is configured by a liquid crystal display or the like and an operation section 227 which is configured by a transmissive member where the display section 228 is visible.

It is possible for image data which is stored in the data storage section 222 to be displayed in the display section 228 as thumbnail images.

A scanner side communication section 226, which is able to communicate with the printer side communication section 211, is provided in the hand-held scanner 2. It is possible for the scanner control section 221 to acquire the detection result of the hand-held scanner detection section 210 via the printer side communication section 211, the scanner side communication section 226, and the printer control section 201.

A printing function, a copying function, and a scanning function of the recording apparatus 1 will be described. The printing function is a function where the printer control section 201 receives printing data from the personal computer 400 via the interface 212 and is recorded on the paper P in the printer section 3.

The copying function is executed in a state where the hand-held scanner 2 is mounted in the casing 4, that is, in a fixed mode where the hand-held scanner 2 reads while fixed. When the copying function is selected by the user by operating the operation section 227 while viewing the content which is displayed and output on the display section 228, an image is read from a document using the hand-held scanner 2, and image data which is read is transmitted to the printer section 3 via the scanner side communication section 226 and the printer side communication section 211 and is recorded by the printer section 3.

The scanning function has a fixed mode where the hand-held scanner 2 reads while fixed in the casing 4 and a moving mode where an image is read while the hand-held scanner 2 is being moved by the hand-held scanner 2 being detached from the casing 4.

In the fixed mode in the scanning function, the scanner control section 221 receives an image reading instruction from the personal computer 400 via the interface 212, the printer control section 201, the printer side communication section 211, and the scanner side communication section 226, reading of a document is performed, and image data which is read is sent to the personal computer 400.

In the moving mode in the scanning function, when the user operates the operation section 227 while viewing the content which is displayed and output on the display section 228, the image data which is read while the hand-held scanner 2 is being moving is stored in the data storage section 222.

The image data which is stored in the data storage section 222 can be transmitted to the printer section 3 via the scanner side communication section 226 and the printer side communication section 211 and can be recorded by the printer section 3. Alternatively, the image data which is stored in the data storage section 222 can be transmitted to the personal computer 400 via the scanner side communication section 226, the printer side communication section 211, the printer control section 201, and the interface 212.

In the scanning function, display content which is displayed and output on the display section 228 and content which is operationally input on the operation section 227 are different during the fixed mode and during the moving mode. For example, while a message which prompts moving of the hand-held scanner 2 is displayed on the display section 228 during the moving mode, a message which prompts moving of the hand-held scanner 2 is not displayed during the fixed mode. In addition, there is an operational input of selecting between driving of the driving rollers 23 and 24 in the hand-held scanner 2 and carrying out of reading in self-operating mode or carrying out of reading by free rotation of the driving rollers 23 and 24 in the operation section 227 in the moving mode, but there is no operational input such as this in the fixed mode.

Above, the recording apparatus 1 in FIG. 5 which describes the present embodiment is provided with the recording head 4 which records on the paper P and the discharge tray 6 which is provided to be able to slide with regard to the casing 4 in FIG. 1B and holds the paper P which is recorded upon using the recording head 104 and discharged. The discharge tray 6 has the through section 63 which is formed on the downstream side in the discharge direction D1 and the handle section 64 which is formed at an edge section more to the downstream side in the discharge direction D1 than the through section 63. The handle section 64 is accommodated inside of the casing 4 in a state where the discharge tray 6 is accommodated in the casing 4, the through section 63 and the handle section 64 are positioned outside of the casing 4 in a state where the discharge tray 6 is drawn out from the casing 4, and the discharge tray 6 is supported in a state of hanging down from the casing 4.

According to this configuration, it is possible for the user to grasp the handle section 64 using a hand and to carry the recording apparatus 1 in a state of being lifted by hand. Then, the handle section 64 is accommodated inside of the casing 4 in a state where the discharge tray 6 is accommodated in the casing 4. As a result, it is possible to suppress an increase in the size of the recording apparatus 1.

In addition, the discharge tray 6 closes off the discharge opening 9 from which the paper P is discharged in a state where the discharge tray 6 is accommodated in the casing 4.

Due to this, it is possible to suppress infiltration of dirt or dust from the discharge opening 9 when the recording apparatus 1 is not in use. In addition, the aesthetics of the outer appearance of the recording apparatus 1 are improved.

In addition, the thickness of the discharge tray 6 is formed to be thicker toward the downstream side in the discharge direction D1.

Due to this, the discharge opening 9 is formed in an upper section of the discharge tray 6 in a state where the discharge tray 6 is drawn out from the casing 4 and it is possible for the discharge opening 9 to be closed off in a state where the discharge tray 6 is accommodated in the casing 4.

In addition, the hand-held scanner 2 is provided as a scanner section which reads a document and the document which is read by the hand-held scanner 2 is discharged to the discharge tray 6 and held in the discharge tray 6.

Due to this, it is possible to suppress an increase in the size of the recording apparatus 1 since it is possible for the discharge tray 6 which holds the paper P and the discharge tray 6 which holds the document to be used together.

There is provided the printer section 3 which prints onto the paper P in FIG. 6, the hand-held scanner 2 as the scanner section which is mounted to be able to be attached to and detached from the printer section 3, has the display section 228, the operating section 227, and the scanner control section 221 as the control section, and which reads an image, and the hand-held scanner detection section 210, which detects whether the hand-held scanner 2 is mounted to or separated from the printer section 3, as the mounting state detecting section.

Using the detection result of the hand-held scanner detection section 210, the scanner control section 221 executes display and output using the display section 228 and operational input using the operating section 227 in the fixed mode where the hand-held scanner 2 reads while fixed when the hand-held scanner 2 is mounted to the printer section 3, and the scanner control section 221 executes display and output using the display section 228 and operational input using the operating section 227 in the moving mode where the hand-held scanner 2 reads while being moved when the hand-held scanner 2 is separated from the printer section 3.

According to this configuration, the scanner control section 221 which is provided in the hand-held scanner 2 determines between the fixed mode or the moving mode using the detection results of the hand-held scanner detection section 210. Due to this, it is possible for the user to use the recording apparatus without having to distinguish between the fixed mode or the moving mode.

Embodiment 2

Figure 7:
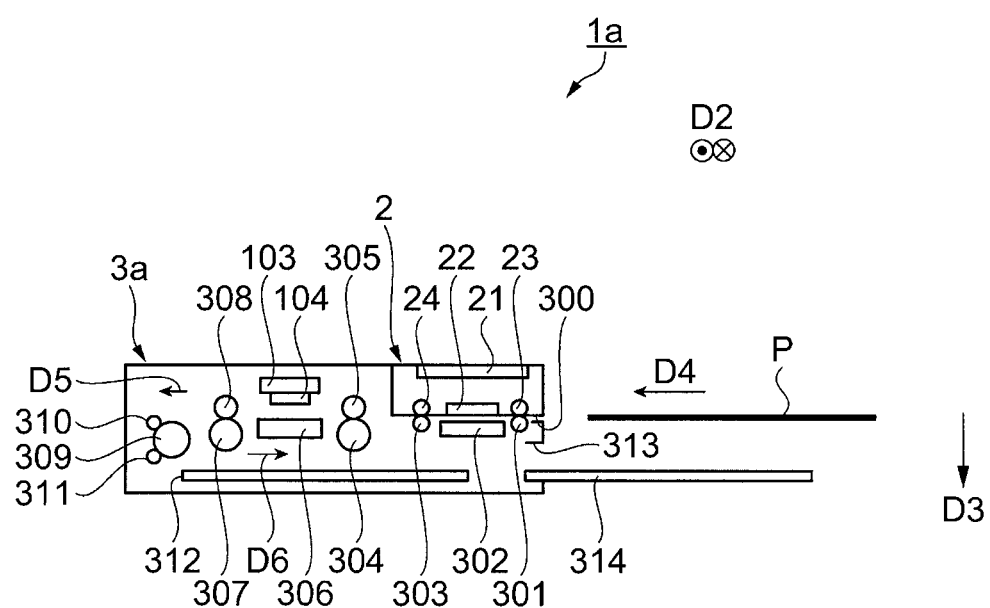
FIG. 7 is a schematic diagram illustrating an outline configuration of a recording apparatus of embodiment 2.

A recording apparatus where the paper P is reversed will be described in embodiment 2. FIG. 7 is a schematic diagram illustrating an outline configuration of a recording apparatus 1a of embodiment 2. The paper P is inserted by the user from an insertion opening 300 in a direction D4 from the front surface side. The paper P is transported in the direction D4 by being nipped by the driving rollers 23 and 24 in the hand-held scanner 2 and driving rollers 301 and 303. The image sensor 22 reads the image which is depicted on the document which is transported below the hand-held scanner 2.

Furthermore, the paper P is transported in a direction D5 by being nipped by each of a driving roller 304 and a driven roller 305 which rotates by abutting against and being driven by the driving roller 304 and a driving roller 307 and a driven roller 308 which rotates by abutting against and being driven by the driving roller 307.

The carriage 103 which is provided with the recording head 104 and a support section 306 which opposes the recording head 104 are provided between the driving roller 304 and the driving roller 307. An image is formed on the paper P by ink being ejected from the recording head 104 onto the paper P which is transported.

A driving roller 309 and driven rollers 310 and 311 which rotate by abutting against and being driven by the driving roller 309 are provided at the rear surface side of the recording apparatus 1a. The paper P is reversed by being nipped by the driving roller 309 and the driven roller 310 and 311 and transported in a direction D6 along a guiding section 312. The paper P is discharged from a discharge opening 313 and placed on a discharge tray 314.

In a case where the image is formed by the paper P being transported in the directions D4 and D5 and ink being ejected from the recording head 104, the paper P is not reversed, is transported in the direction D6, and placed on the discharge tray 314, the length of the transport direction D4 (D5 and D6) of the paper P is restricted due to the length of the recording apparatus 1a in the transport direction D4.

In the recording apparatus 1a in the present embodiment which is described using FIG. 7, the length of the transport direction D4 of the paper P is not restricted due to the length of the recording apparatus 1*a* in the transport direction D4 since the paper P is reversed, and it is possible for the length of the transport direction D of the paper P to be longer than the length of the recording apparatus 1*a* in the transport direction D4.

In addition, operability is excellent since it is possible for the user to insert the paper P from the front surface side and recover the paper P which is discharged from the front surface side. In addition, it is possible to shorten the length of the recording apparatus in the transport direction D4 since a paper support which supports the paper at the rear surface side is not provided.

The outline of the electrical configuration of the recording apparatus 1*a* is the same as the configuration which is described in embodiment 1 by referencing FIG. 6.

Embodiment 3

Figure 8A:
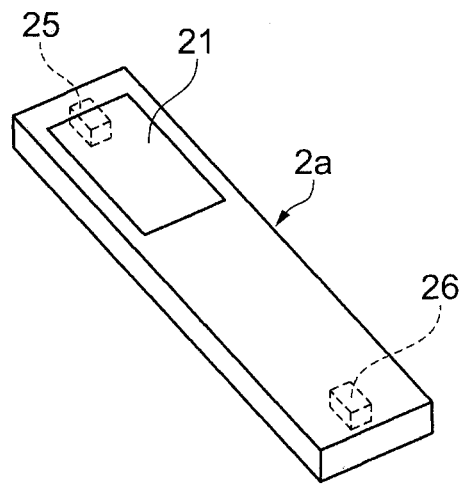
FIG. 8A is a perspective diagram of a hand-held scanner of embodiment 3.

Performing of image correction using a hand-held scanner 2*a* which is provided with acceleration sensors will be described in embodiment 3. FIG. 8A is a perspective diagram of the hand-held scanner 2*a* of embodiment 3. Acceleration sensors 25 and 26 are provided on both edge sections of the hand-held scanner 2*a* in the longitudinal direction.

Angular velocity data which is acquired from the acceleration sensors 25 and 26 for each main scanning by the image sensor 22 is converted from analog to digital by an AD converter (which is not shown in the diagram), the converted angular velocity data is further converted to angle data by integration processing, and the amount of positional deviation is calculated. The image data, which is read using the image sensor 22, is corrected in units of pixels based on the amount of positional deviation which is calculated.

By doing this, image quality of the image data which is read is improved. Other configurations of the recording apparatus in embodiment 3 are the same as the configuration of the recording apparatus 1 in embodiment 1.

Embodiment 4

Figure 8B:
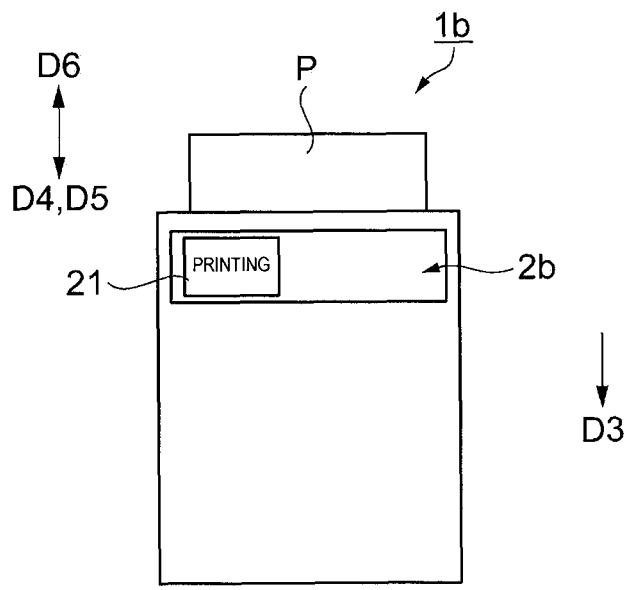
FIG. 8B is a diagram illustrating a state where a rear surface of a recording apparatus of embodiment 4 abuts against a placement surface.
Figure 8C:
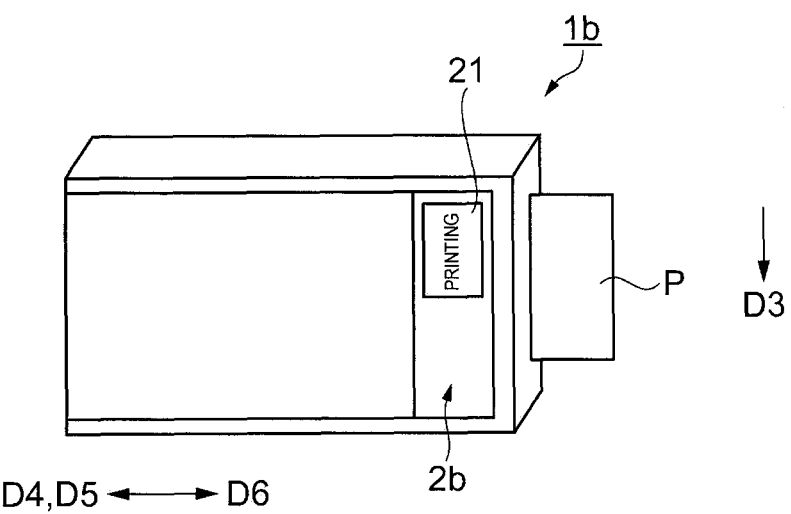
FIG. 8C is a diagram illustrating a state where a side surface of a recording apparatus abuts against a placement surface.

A recording apparatus in embodiment 4 is able to print and read even when the posture of the casing is changed. FIG. 8B is a diagram illustrating a state where a rear surface of a recording apparatus 1*b* of embodiment 4 abuts against a placement surface. FIG. 8C is a diagram illustrating a state where a side surface which is orthogonal to the rear surface of the recording apparatus 1*b* abuts against a placement surface. The transport path of the paper P in the recording apparatus 1*b* is the same as the configuration in the recording apparatus 1*a* in embodiment 2 which is described by referencing FIG. 7.

In embodiment 4, the vertical direction D3 is calculated using acceleration sensors when in the fixed mode where a hand-held scanner 2*b* is mounted in the casing 4 and the text which is displayed on the display section 228 is written vertically or horizontally based on the calculation result.

As shown in FIG. 8B, the scanner control section 221 sets the text which is displayed on the display section 228 of the touch panel 21 to be written horizontally when the vertical direction D3 is the same direction as the directions D4, D5, and D6 in which the paper P is transported.

As shown in FIG. 8C, the scanner control section 221 sets the text which is displayed on the display section 228 of the touch panel 21 to be written vertically when the vertical direction D3 is a direction which intersects with the directions D4, D5, and D6 in which the paper P is transported.

The scanner control section 221 in the present embodiment detects information on the posture on the hand-held scanner 2*b* based on the output information from the acceleration sensors when in the fixed mode where the hand-held scanner 2*b* is mounted in the casing 4, and the text which is displayed on the display section 228 is written vertically or horizontally based on the information on the posture which is detected. By doing this, it is easy for the user to visually recognize the text which is displayed on the display section 228.

The recording head 104 which is described from embodiment 1 to embodiment 4 is provided in the carriage 103 which reciprocates in the width direction D2, but a recording head which is able to record in the width direction D2 can be provided to be fixed.

What is claimed is:

1. A recording apparatus comprising:
a casing;
a recording head which records on a recording medium which is driven inside the casing;
a discharging unit which discharges, in a discharge direction, the recording medium which has been recorded by the recording head; and
a discharge tray disposed downstream relative to the discharging unit in the discharging direction, the discharge tray being slidable with regard to the casing in the discharge direction and configured to hold, on the discharging tray, the recording medium which has been discharged by the discharging unit,
the discharge tray having a handle section,
the handle section being accommodated inside of the casing in a state where the discharge tray is accommodated in the casing, and
the casing being configured to be carried by hanging down using the handle section in a state where the discharge tray is drawn out from the casing.

2. The recording apparatus according to claim 1, wherein the discharge tray closes off a discharge opening from which the recording medium is discharged in a state where the discharge tray is accommodated in the casing.

3. The recording apparatus according to claim 2, wherein the thickness of the discharge tray is formed to be thicker toward the downstream side in the discharge direction.

4. The recording apparatus according to claim 3, further comprising:
a scanner section which reads a document,
wherein the document which is read by the scanner section is discharged to the discharge tray and held in the discharge tray.

5. The recording apparatus according to claim 1, wherein the discharge tray has a through hole section and an end surface that is disposed at a downstream end of the discharged tray in the discharge direction, and a part of the through hole section and a part of the end surface define the handle section.

6. The recording apparatus according to claim 5, wherein the discharge tray further has an end portion and a plate section with a plate shape, the end portion is disposed downstream relative to the plate section in the discharge direction, a thickness of the end portion increases as the end portion approaches the end surface, and the through hole section is disposed in the end portion.

7. The recording apparatus according to claim 1, wherein the discharge tray further has a protruding portion disposed at an upstream end of the discharge tray in the discharge direction, the case has a contact portion, the contact portion contacts the protruding portion while the discharge tray is drawn out from the casing, and the contact portion and the protruding portion are positioned away from each other in the discharge direction while the discharge tray is accommodated in the casing.

8. The recording apparatus according to claim 1, further comprising a recording medium supporting unit which supports the recording medium to be fed toward the recording head, wherein the recording medium supporting unit is switchable between an expanding condition that allows for recording on the recording medium, and a non-expanding condition that prohibits the recording on the recording medium.

9. A recording apparatus comprising:

a printer section which prints onto the recording medium;

a scanner section mounted on the printer section so as to be attachable to and detachable from the printer section, the scanner section having a display section, an operating section, and a control section, the scanner section being configured to read an image; and a mounting state detecting section which detects whether the scanner section is mounted to or detached from the printer section, using the detection result of the mounting state detecting section, the control section performing reception of a first output of a display using the display section and a first operation using the operation section in a fixed mode where the scanner section reads while the scanner section is stationary with respect to the printing section and the scanner section is mounted to the printer section, and the control section performing reception of a second output of a display using the display section and a second operation using the operation section in a moving mode where the scanner section reads while the scanner section is moving independently of the printing section and the scanner section is detached from the printer section.

10. The recording apparatus according to claim 9, wherein the scanner section is provided with acceleration sensors, and the control section detects information on the posture of the scanner section based on the output information from the acceleration sensors when in the fixed mode and sets text which is displayed on a display section to be written vertically or horizontally based on the information on the posture which is detected.

11. The recording apparatus in according to claim 9, wherein the first output of the display is different from the second output of the display, and the first operation is different from the second operation.

12. A recording apparatus comprising:

a printer section which prints onto the recording medium;

a scanner section which is mounted to be able to be attached to and detached from the printer section, has a display section, an operating section, and a control section, and which reads an image; and a mounting state detecting section which detects whether the scanner section is mounted to or separated from the printer section, using the detection result of the mounting state detecting section, the control section performing reception of output of a display using the display section and an operation using the operation section in a fixed mode where the scanner section reads while fixed when the scanner section is mounted to the printer section, and the control section performing reception of output of a display using the display section and an operation using the operation section in a moving mode where the scanner section reads while being moved when the scanner section is separated from the printer section, the scanner section being provided with acceleration sensors, and the control section acquiring angular velocity from the acceleration sensors while an image is being read when in the moving mode and corrects the image which is read based on an amount of positional deviation which is calculated from the angular velocity.

\* \* \* \* \*